US007131760B2

(12) United States Patent
Mayer et al.

(10) Patent No.: US 7,131,760 B2

(45) Date of Patent: Nov. 7, 2006

(54) LED LUMINAIRE WITH THERMALLY CONDUCTIVE SUPPORT

(75) Inventors: Mark J. Mayer, Sagamore Hills, OH (US); Mathew Sommers, Sagamore Hills, OH (US)

(73) Assignee: Gelcore LLC, Valley View, OH (US)

( * ) Notice: Subject to any disclaimer, the term of this patent is extended or adjusted under 35 U.S.C. 154(b) by 50 days.

(21) Appl. No.: 10/783,172

(22) Filed: Feb. 20, 2004

(65) Prior Publication Data

US 2005/0185417 A1 Aug. 25, 2005

(51) Int. Cl.

| | |
|---|---|
| ***F21V 7/24*** | (2006.01) |
| ***F21V 7/04*** | (2006.01) |
| ***B60Q 1/00*** | (2006.01) |

(52) U.S. Cl. ...................... 362/555; 362/547; 362/548; 362/549

(58) Field of Classification Search ................ 362/547, 362/548, 549

See application file for complete search history.

(56) References Cited

U.S. PATENT DOCUMENTS

| | | | | |
|---|---|---|---|---|
| 3,803,401 | A * | 4/1974 | Drews | 362/218 |
| 5,394,317 | A * | 2/1995 | Grenga et al. | 362/347 |
| 6,116,758 | A * | 9/2000 | Lin | 362/364 |
| 6,862,091 | B1 * | 3/2005 | Johnson | 356/326 |
| 2002/0136025 | A1 * | 9/2002 | Zhang | 362/555 |
| 2003/0063476 | A1 * | 4/2003 | English | 362/545 |
| 2004/0252502 | A1 * | 12/2004 | McCullough et al. | 362/241 |
| 2005/0168994 | A1 * | 8/2005 | Jacobson et al. | 362/311 |

* cited by examiner

*Primary Examiner*—Renee Luebke
*Assistant Examiner*—Evan Dzierzynski
(74) *Attorney, Agent, or Firm*—Fay, Sharpe, Fagan, Minnich & McKee, LLP

(57) ABSTRACT

A heat dissipating lamp is provided. The lamp includes a reflector, a lens cover, a support structure interposed between the reflector and the lens cover, and an LED mounted to the support structure. The lens cover includes a portion adjacent a peripheral edge of the reflector. The support structure includes a bridge.

8 Claims, 2 Drawing Sheets

LED LUMINAIRE WITH THERMALLY CONDUCTIVE SUPPORT

BACKGROUND OF THE INVENTION

The present invention relates generally to illumination devices. It finds particular application in conjunction with illumination devices employing multiple light emitting diodes ("LEDs") and will be described with particular reference thereto. It will be appreciated, however, that the invention is also amenable to other like applications.

Most automotive lamps use incandescent filaments to generate light. The light can be reflected off a simple mirror-type reflector. LEDs have been replacing incandescent filaments as a light source, because LEDs are more efficient and longer lasting.

LEDs are small efficient light sources, but to emit a sufficient amount of light, especially in an automotive lamp, a plurality of LEDs need to be grouped together. Pointing the LEDs toward the field where illumination is desired can appear to an onlooker as a group of bright dots. A reflector is provided in the lamp to direct and scatter the light so that the lamp does not look like a plurality of lighted dots.

LEDs operate at high temperatures. High operating temperatures degrade the performance of LED lighting systems. Also, high-powered LEDs can have very wide light emission angles, some approaching or exceeding 180°. Existing LED reflector/thermal systems either collect a much smaller cone angle of light or fail to provide a thermal path for heat convection.

Accordingly, it is desirable to design a lamp that collects the majority of light emitted by an LED and directs it toward a desired target. It is also desirable to position the LED such that light reflected by the reflector does not strike the LED resulting in additional heat being directed toward the LED. It is also desirable to provide a suitable thermal path for cooling the lamp.

SUMMARY OF THE INVENTION

According to one aspect of the invention, a heat dissipating lamp is provided. The lamp includes a reflector, a lens cover, a support structure interposed between the reflector and the lens cover, and an LED mounted to the support structure. The support structure includes a portion adjacent a peripheral edge of the reflector.

In accordance with another aspect of the invention, a lamp includes a reflector, a lens cover, a support structure interposed between the reflector and the lens cover, a bridge attached to the support structure, and an LED mounted to the bridge. The reflector is formed such that light reflected from the reflector is directed towards the lens cover and to either side of the bridge.

In accordance with yet another aspect of the invention, a heat dissipating lamp is provided. The lamp includes a reflector, a lens cover, a support structure interposed in between the reflector and the lens cover, a bridge attached to the support structure, and an LED mounted to the bridge. The reflector includes a contoured base and a periphery. The bridge is spaced from the contoured base of the reflector.

Advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps arrangements of steps. The drawings are only for purposes of illustrating a preferred embodiment and are not to be construed as limiting the invention.

DETAILED DESCRIPTION OF THE INVENTION

Figure 1:
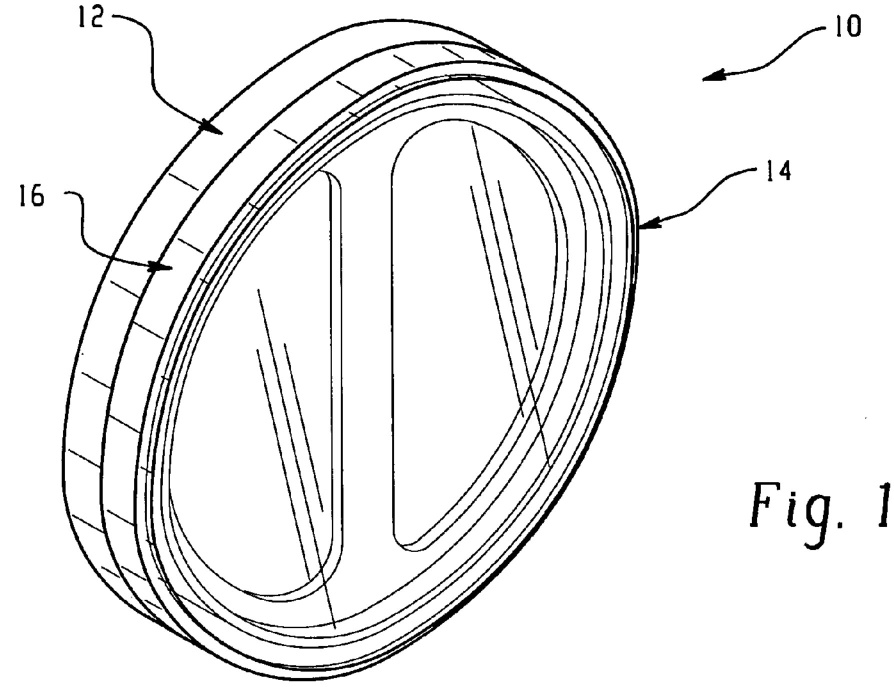
FIG. 1 illustrates a perspective view of the lamp according to the present invention.

Referring to FIG. 1, a lamp 10 includes a reflector 12, a lens cover 14 and a support structure 16 interposed between the reflector and the lens cover. At least one LED 18 (FIG. 3) mounts to the support structure and faces the reflector. A housing (not shown) can enclose the lamp.

Figure 2:
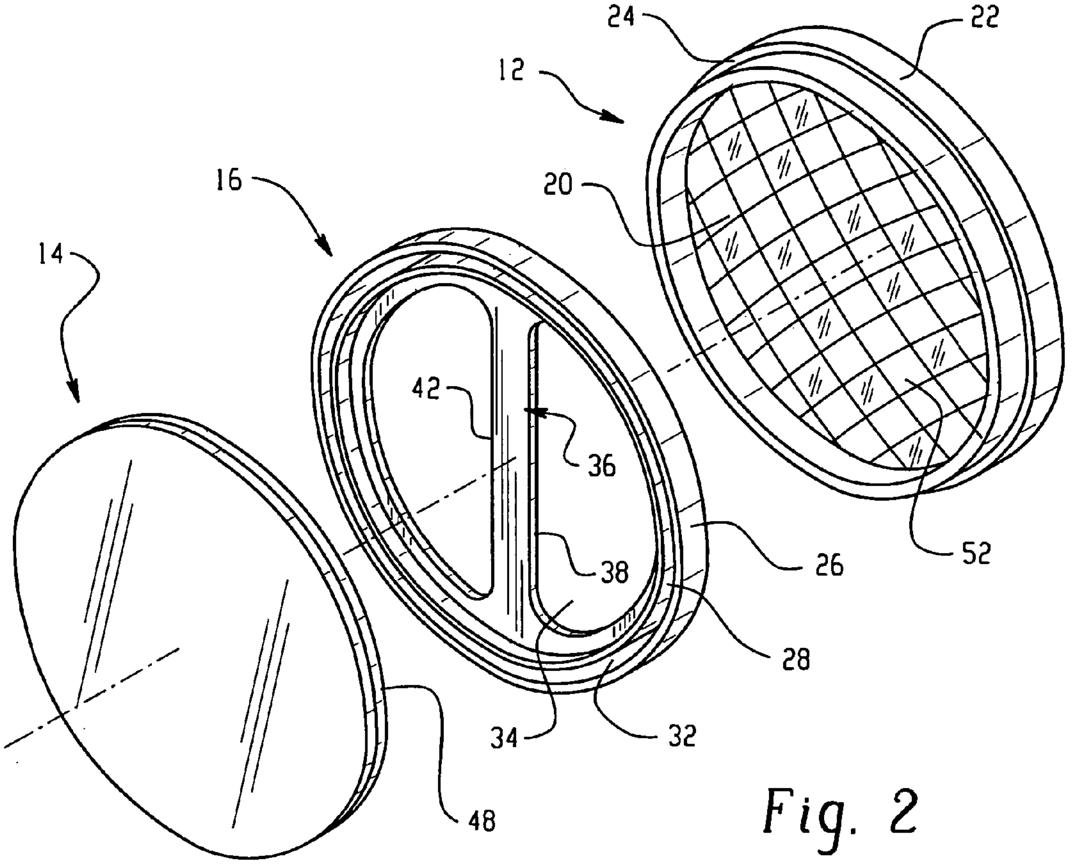
FIG. 2 illustrates an exploded view of the lamp of FIG. 1.

Referring to FIG. 2, the reflector 12 includes a base 20 and a peripheral wall 22. In this embodiment, the base is dish-shaped. The base 20 and the peripheral wall 22 define a channel 24 between them. The channel 24 receives a portion of the support structure 16. The peripheral wall 22 and the channel 24 are substantially circular from a front elevation view. In alternative embodiments, the peripheral wall and the channel, as well as the reflector itself, can take other shapes, such as square, rectangular or other configurations. Likewise, the base 20 need not be dish-shaped, but can take other configurations, including box-shaped, cone-shaped, and frusto-conical shaped to name just a few.

The support structure 16 includes a peripheral wall 26 and an inner wall 28 spaced from the peripheral wall. The peripheral wall 26 and the inner wall 28 connect and define a channel 32 between them. The peripheral wall 26 and the inner wall 28 are received in the channel 24 of the reflector 12. The internal wall 28 defines an internal opening 34. A bridge 36 spans the opening 34. The bridge and the support structure can be made from one piece, or the bridge can be a separate piece that attaches to the support structure. In a preferred embodiment, the bridge 36 substantially bisects the opening 34 and the support structure 16. Lateral walls 38 and 42 depend from the bridge 36 towards the reflector 12. Optionally, the lateral walls can act as a shield for LEDs that have a very wide light emission angle.

In a preferred embodiment, the support structure 16 is a complementary shape, i.e. annular, of the reflector 12 so that a portion of the support structure can be received in the reflector. In an alternative embodiment, the support structure can mount to the lamp housing, and need not be a complementary shape of the reflector. When the lamp is assembled, the bridge 36 is spaced from the base 20 of the reflector 12.

Figure 3:
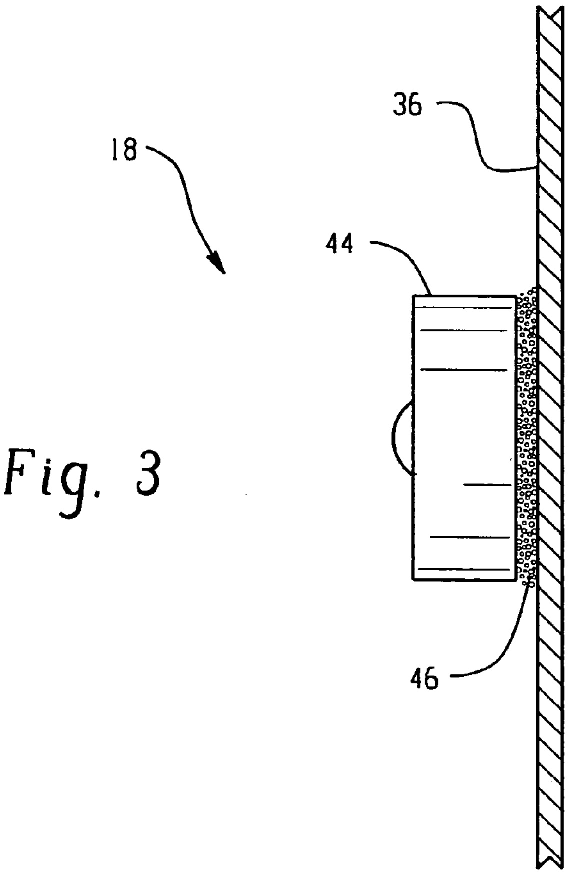
FIG. 3 is a close-up elevation view of an LED mounted to a support structure of the lamp of FIG. 1.

Referring to FIG. 3, the LEDs 18 (only one shown) mount to the bridge 36. The LED mounts to a circuit board 44, which can include MCPCB, flex on thermal substrate, or LED directly on substrate, as well as other conventional circuit board configurations. The circuit board 44 attaches to the bridge 36 on a surface substantially facing the reflector 12. Adhesive material 46, which is preferably thermally conductive, is used to attach the circuit board 44 to the bridge 36. Alternatively, fasteners can be used to attach the LED to the bridge. In one embodiment, the LED 18 or a plurality of LEDs mount the bridge 36 aligned with the focal point or focal points of the reflector 12, which can advantageously provide desired beam patterns.

The bridge is wide enough to allow the LEDs to mount to the bridge. The bridge should also be narrow so that the amount of light that is to be directed around the bridge is minimized. The bridge is depicted as spanning the central opening 34, however, it could cantilever over the opening also. The bridge is made of a thermally conductive material to provide a thermal path to the exterior of the lamp housing so that heat generated by the LEDs can dissipate out of the lamp body. Similarly, the support structure can also be made of a thermally conductive material. The support structure can include cooling fins that reside on the exterior of the lamp housing when assembled.

With reference back to FIG. 2, the lens cover 14 attaches to the support structure 16. The lens cover includes a peripheral wall 48 that is received in the channel 32 of the support structure. Alternatively, the lens cover need not mount directly to the support structure, but can mount to the reflector 12 or to the housing. The lens cover provides protection for the LED and the reflector. In a preferred embodiment, the lens cover is clear, however the lens cover could be colored also.

Figure 4:
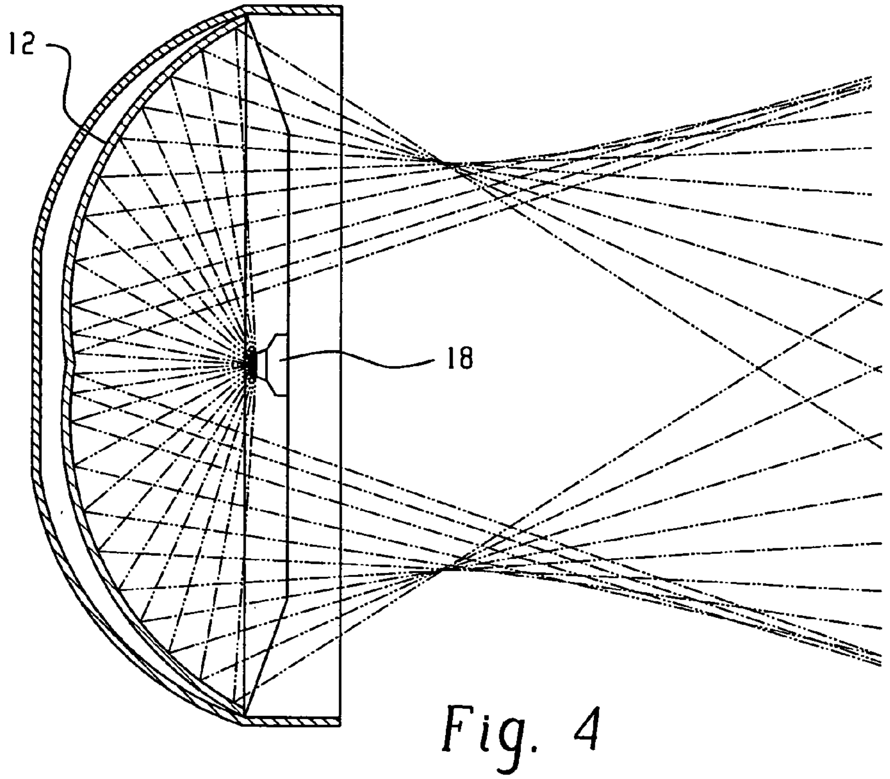
FIG. 4 is a side elevation view of the lamp of FIG. 1 showing the path of light directed from a reflector of the lamp of FIG. 1.

The reflector 12 includes cusps or facets 52. With reference to FIG. 4, the preferred embodiment of the reflector has a somewhat sideways M-shaped contour. The reflector collects the light emitted from the LEDs and reflects the light so that it does not strike the bridge. The reflector is contoured and the cusps or facets are shaped such that light striking the reflector directly behind the bridge is directed to either side of the bridge. Furthermore, the reflector is contoured and the cusps or facets are shaped such that light striking the reflector not directly behind the bridge is directed to the center of the light beam's pattern and to fill in other areas of the beam that may be deficient. Each cusp or facet can be individually aimed so that light reflected from said reflector forms a desired beam pattern while avoiding striking said support structure and the bridge.

In use, electrical current flows through conventional electrical leads (not shown) to illuminate the LEDs. The electrical leads attach to the circuit board 44 and are routed down the length of the bridge and exit the housing. When the LEDs illuminate, the light reflects off of the reflector and through the lens avoiding the bridge and the support structure. Thus, the temperature of the LEDs is not unnecessarily raised by reflecting light, and thus heat, back towards the LED. The thermal energy conducts through the rear of the LEDs, through the adhesive material, through the bridge and support structure and transfers to the outer surface of the support structure and cooling fins if present. Accordingly, a thermal path is provided from the LED to the ambient.

The invention has been described with reference to a preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A lamp comprising:

a housing;

a reflector disposed in the housing;

a bridge disposed in the housing and at least substantially spanning the reflector; and an LED attached to the bridge and facing the reflector, the reflector being shaped such that light striking the reflector directly behind the bridge is directed to either side of the bridge.

2. The lamp of claim 1, further comprising a support structure mounted to at least one of the housing and the reflector, wherein the bridge attaches to the support structure.

3. The lamp of claim 2, wherein the support structure comprises an annular member.

4. The lamp of claim 3, wherein the bridge at least substantially bisects the support structure.

5. The lamp of the claim 1, wherein the reflector is contoured such that light striking the reflector not directly aligned with the bridge is directed toward a center of a light beam pattern.

6. The lamp of claim 1, wherein the reflector has an M-shaped contour in a cross-section.

7. The lamp of claim 1, further comprising a circuit board, the LED being mounted on the circuit board and the circuit board attaches to the bridge.

8. The lamp of claim 1, wherein the circuit board comprises a thermally conductive material.

* * * * *